United States Patent [19]

Behrendt et al.

[11] 4,009,104
[45] Feb. 22, 1977

[54] MARINE SANITATION METHOD AND DEVICE

[75] Inventors: George H. Behrendt; Jesse L. Potter, both of Dallas, Tex.

[73] Assignee: Filteron Systems Inc., Dallas, Tex.

[22] Filed: Aug. 21, 1975

[21] Appl. No.: 606,486

[52] U.S. Cl. .................................. 210/62; 204/149; 210/104; 210/114; 210/152; 210/192; 210/195 R

[51] Int. Cl.² ........................ C02B 1/82; C02B 3/10

[58] Field of Search ............ 204/149, 152, 237–239; 210/62, 64, 73, 83, 84, 104, 114, 124, 152, 167, 192, 195 R

[56] References Cited
UNITED STATES PATENTS

| | | | |
|---|---|---|---|
| 3,655,048 | 4/1972 | Pergola | 210/152 X |
| 3,679,053 | 7/1972 | Koulovatos et al. | 210/104 X |
| 3,766,037 | 10/1973 | Lee | 204/149 X |
| 3,844,946 | 10/1974 | Farrell, Jr. | 210/104 |
| 3,915,857 | 10/1975 | Olson | 210/104 X |
| 3,925,176 | 12/1975 | Okert | 204/149 X |
| 3,933,606 | 1/1976 | Harms | 204/149 X |
| 3,936,364 | 2/1976 | Middle | 204/149 X |

*Primary Examiner*—Charles N. Hart
*Assistant Examiner*—Robert H. Spitzer
*Attorney, Agent, or Firm*—Richards, Harris and Medlock

[57] ABSTRACT

Automatic marine sewage treatment through a pair of tanks with salt water based sewage fed to the first tank after removal of solids above a predetermined size. Circulation means responsive to liquid levels in the tanks cause batch transfer of liquids from the first tank to the second tank and multiply circulate a stream of liquids from and to the second tank while filling the first tank. Electrolytic treatment subjects the stream to D.C. current flow, producing treating chemicals. Treated liquids are discharged from the second tank when the first tank reaches a control level, delivering a predetermined fraction of the treated liquids to the first tank.

7 Claims, 8 Drawing Figures

MARINE SANITATION METHOD AND DEVICE

This invention relates to salt water sewage treatment and more particularly to treatment of salt water sewage which is passed directly through electrolytic cells thereby to generate chemicals which treat the sewage in a system having a unique relationship between tank sizes, pumping rates and electrolytic cell currents for assuring treatment at a given sewage flow rate to the system.

Treatment of organic compounds in the marine industry has become a problem as the number and size of vessels and offshore stationary platforms have increased. The need for a compact, efficient, automatic waste treatment process that produces a discharge effluent that meets certain minimum physical and biological requirements is apparent.

Prior systems share certain disadvantages. Prior biological digestion systems employ simple, flow-through processing with sizable liquid volumes in storage at all times. It is recognized as desirable to retain liquids for from twelve to sixteen hours. Excessive tankage is required which adds weight to the system in the form of stored liquid and structural materials. Excessive weight is a significant disadvantage for mobile marine installations. Also, the vagaries of the climate influence the degree of treatment which is possible with such plants.

In another prior system, in an electro-mechanical system, suspended solids are separated from the liquid and passed to a suitable incinerator while the liquid is treated in an electro-coagulation tank. Direct current is passed between iron plates immersed in the liquid forming ferrous hydroxide which combines with the negatively charged sewage to form a floc. The floc is passed back to a sludge tank and subsequently to an incinerator. The liquid is then chlorinated or exposed to ultra-violet light and discharged overboard. Such a system is smaller and lighter than the biological digestion systems but is very costly and requires a highly complex control system and careful proportioning of solids and liquids.

In prior physical chemical treatment systems, the sewage is chemically treated and solids are physically removed by flocculation and/or filtration.

Most existing physical-chemical treatment systems required the addition of costly chemicals such as oxidizing agents and floculents. Chemical feed systems which are required for chemical addition require pumps, tanks, piping and controls which are costly and need maintenance. Existing physical chemical systems utilize an over-abundance of filters to eliminate various organic and particulate materials. It is common practice to use clay filters, activated carbon filters and other filtration materials to filter specific substances prior to discharging the fluid. Multiple use of filters adds expense and maintenance costs. Additionally the systems are extremely complex in function as well as in equipment. Operation is needlessly time consuming and therefore does not get the attention it requires from maintenance personnel.

In order to circumvent the disadvantages of existing biological as well as physical chemical marine sewage treatment systems, the marine sanitation system of the present invention combines physical removal and incineration of solids, followed by an electro-chemical oxidation of the soluble organics. Abundant sea water is used to synthesize oxidizing chemicals which are then used to treat the sewage. Strong oxidizing chemical agents are produced by conversion of the sea water as it passes through electrolytic cells. The agents thus produced destroy the organic compounds in the sewage, eliminate odors and disinfect the effluent which is then filtered prior to discharge.

Standards for treatment of sewage on ocean going vessels and offshore platforms has been established by the United States Coast Guard and other regulatory agencies. The standards require that no effluent be dumped into the ocean containing solids measured in terms of biological oxygen demand (BOD) in excess of 50 parts per million nor containing solids in excess of 50 parts per million nor containing bacteria in excess of 1000 counts per 100 milliliters. The present invention is directed to a system that operates well within those limits and serves to function automatically in response to demand.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 8 is a diagrammatic view of the controls of FIGS. 1-3.

Figure 1:
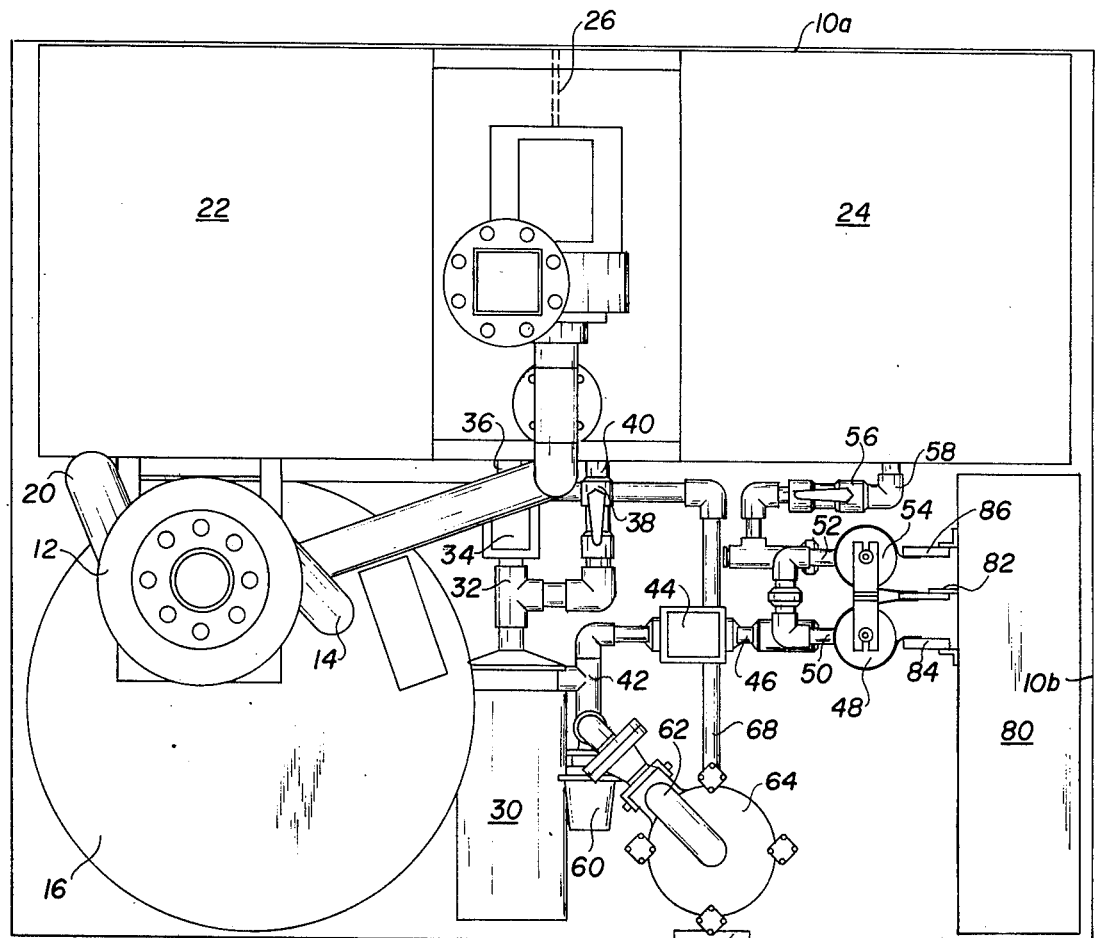
FIG. 1 is a top or plan view of a marine sanitation device of 10,000 gallon per day sewage treatment capacity.
Figure 3:
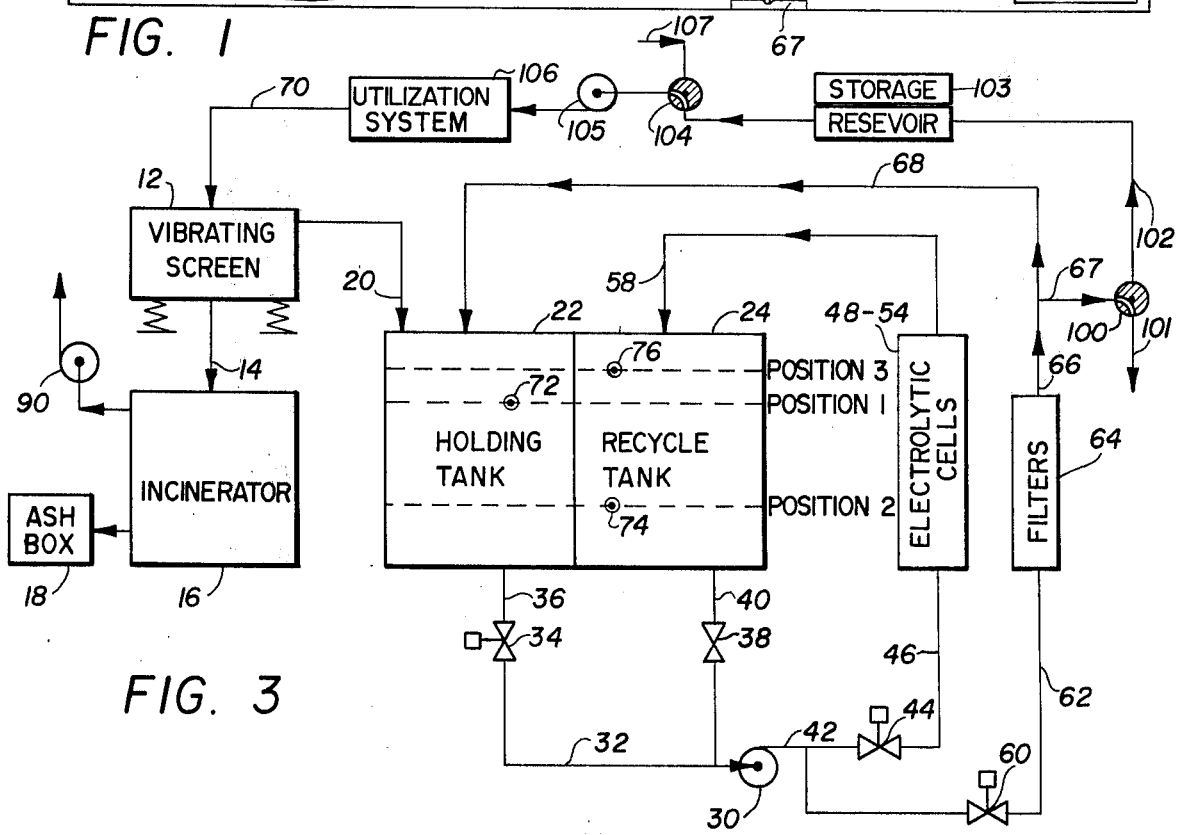
FIG. 3 is a simplified block diagram of the plant of FIGS. 1 and 2.
Figure 2:
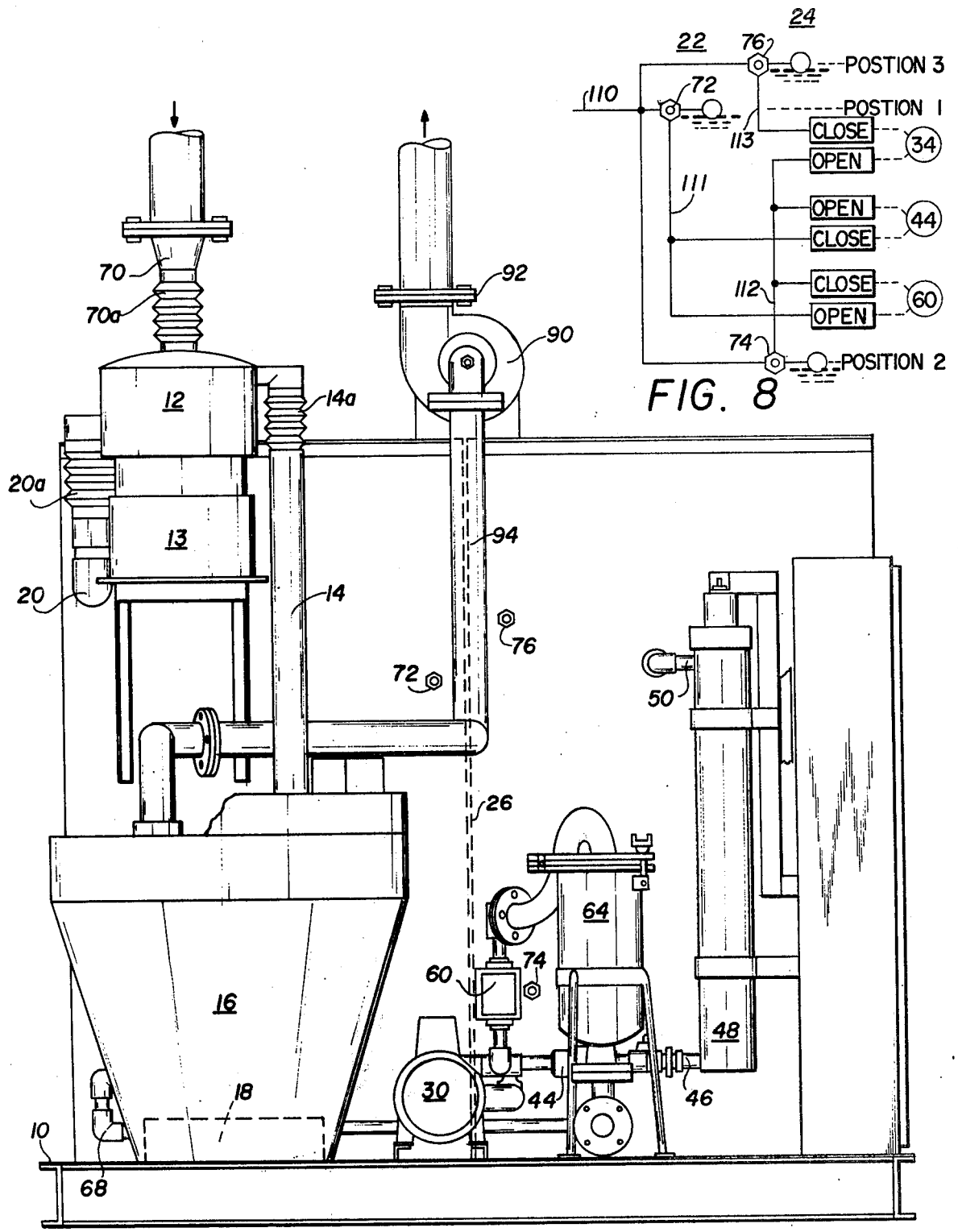
FIG. 2 is a side elevation view of the plant of FIG. 1 as viewed from lines 2—2, FIG. 1.

Referring now to the FIGS. 1-3, the sewage treatment plant has all its components mounted on a skid 10. A moving screen separator 12 removes the solids from liquids entering separator 12. The solids retained on the screen are conveyed by line 14 to an incinerator 16. The refuse left in the incinerator after incineration is collected in an ash box 18 for removal and dispersal. Being sintered ash, it can be thrown overboard or otherwise disposed of as garbage.

Liquids entering the screen separator 12 pass by way of the line 20 into a first holding tank 22. Tank 22 serves as a surge tank and holding tank for raw sewage. Tank 22 receives sewage until the sewage level therein reaches a predetermined height.

A recycle treatment tank 24 is positioned at the side of tank 22. Tanks 22 and 24, in the 10,000 gallon per day unit, are of 350 gallon capacity each. They are arranged in side by side relation along edge 10a of skid 10. Tanks 22 and 24 are separated by a bulkhead 26, shown dotted in FIGS. 1 and 2.

A pump 30 is mounted from the floor of skid 10. An input line 32 leading to pump 30 is connected by way of valve 34 and a line 36 leading from near the bottom of tank 22. Line 32 is also connected by way of valve 38 to a line 40 leading from a level near the bottom of tank 24. Pump output line 42 is connected by way of valve 44 in an inlet line 46 in the bottom of a first electrolytic cell 48. An output line 50 from cell 48 is connected to an input line 52 of a second electrolytic cell 54. The bottom output line from cell 54 is then connected through a valve 56 to an inlet 58 near the bottom of the recycle tank 24. Output line 42 from pump 30 is also connected by way of a valve 60 to the input line 62 of a final filter 64. A line 66 leads from filter 64 to a system output coupling 67. The flow from filter is divided between line 67 and a line 68 which leads back into tank 22 to provide chemicals for maintaining a preliminary chemical treating action in tank 22 as will be further described.

In operation, liquid carrying solids from bathroom facilities or from kitchen facilities may be introduced into the treatment unit through the inlet 70 leading to the upper end to the input of screen 12.

Screen 12 is a centrifugal reciprocating or conveyor type liquid-solid screen separator driven by motor 13 and flow coupled by way of rubber bellows 14a, 20a and 70a. Solids are screened from liquids and vibrated to a position to fall through tube 14 into the incinerator. Liquids and the finer solids pass through line 20 to the surge tank 22.

The screen unit 12 may be of the type manufactured and sold by Sweco Incorporated of Los Angeles, Calif. and identified as Standard 18" Sweco Vibro-Energy Separator.

The incinerator 16 may be of the type manufactured and sold by Schirco Incorporated of Dallas, Tex.

Pump 30 was a 5 HP plastic impeller centrifugal pump.

The electrolytic cells 48 and 54 were of the type which will hereinafter be described in further detail.

The final filter 64 was of the type manufactured and sold by GAF Corporation, New York, N.Y. and identified as Model RB-1A.

In operation, conditions at start up are that tank 24 contains clean sea water to the level of position 3, FIG. 3. Tank 22 contains clean sea water to the level of position 1. The system is ready for operation.

Level probe in tank 22 at position 1 initiates the following simultaneous actions:

valve 44 switches from normally open condition to closed; and
valve 60 switches from normally closed condition to open.

Liquid level drops to position 2 in tank 24 and because of flow in line 68, the liquid level rises to position 3 in tank 22. Level probe at position 2 in tank 24 initiates the following simultaneous actions:

valve 44 switches from closed to normally open condition;
valve 60 switches from open to normally closed condition; and
valve 34 switches from normally closed condition to open.

Liquid rises to position 3 in tank 24 and drops to position 2 in tank 22. Level probe at position 3 in tank 24 initiates the following action:

valve 34 switches from open to normally closed condition.

As sewage is deposited in tank 22, the liquid level in tank 22 will rise to position 1 and the entire cycle will repeat itself.

Recycle of the fluid through tank 24 and the electrolytic cells 48 and 54 serves to oxidize organics in the liquid in the tank 24. All bacteria are killed. Color compounds are destroyed. The stream in the course of this operation becomes saturated with dissolved oxygen and sodium hypochlorite is produced. Circulation of all liquids from tank 24 through the electrolytic cells 48 and 54 ten times has been found to more than satisfy any of the standards above noted.

Included in the system is a power pack 80 mounted near edge 10b of skid 10. The power pack 80 is supplied with power from the power source available on the given ship or platform and is converted to D.C. power at 6 volt level. Electrolytic cells 48 and 54 physically are mounted on the side of the power pack 80 being supported by a bus bar 82 leading to the anodes of the electrolytic cell and by bus bars 84 and 86 leading to the cathodes thereof.

Figure 4:
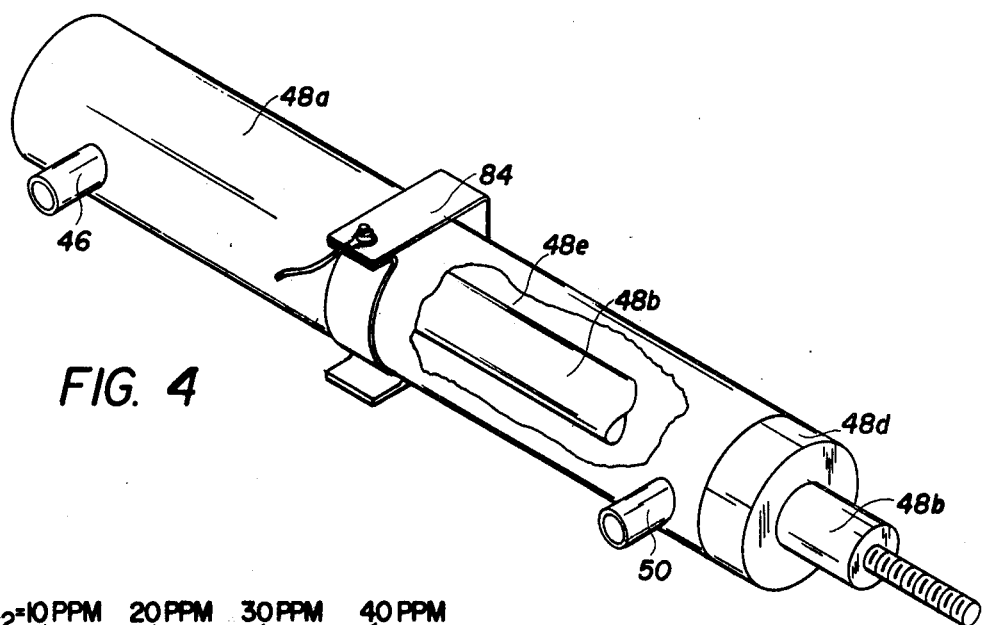
FIG. 4 is an isometric view partially in section showing the construction of electrolytic cells used in the invention.

FIG. 4 is an isometric view, partially in section, illustrating the construction of one embodiment of the electrolytic cell. The inlet line 50 leads to a hollow cylindrical housing 48a that serves as the cathode. An anode 48b constructed of graphite or platinum coated steel extends through the upper end of the housing 48a. The housing is sealed by a suitable insulating pressure connector 48d with outlet line 50 extending from an opening near the upper end thereof. An electrically conducting solution (NaCl and water) fills the small annulus 48e between the exterior surface of anode 48b and the interior surface of cathode 48a. Bus bar 84 leads to cathode 48a and bus bar 82 is connected to anode 48b.

As liquid flows into cell 48 through inlet 50, it passes up through the annulus 48e while D.C. current flows between anode 48b and cathode 48a.

Figure 5:
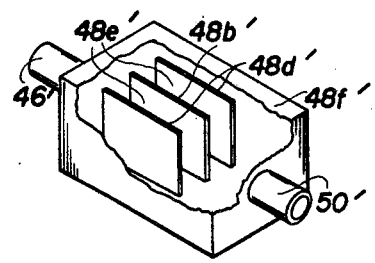
FIG. 5 illustrates a modified electrolytic cell.

FIG. 5 is another embodiment of an electrolytic cell where the inlet 50', the anode 48b', the cathodes 48d', the intervening spaces 48e' and the outlet 46' have the same functions as the corresponding components in FIG. 4a. The plate anode 48b' and the plate cathodes 48d' are electrically insulated from each other and from the enclosure 48f' by suitably positioned insulating rods (not shown).

In accordance with the present invention, the controls provided by valves 34, 44 and 60 and the level sensors 72, 74 and 76 in the flow arrangement shown provide a basis for a sewage treatment device relatively small in physical size yet of substantially larger sewage handling capacity than other units of comparable rating. Thus the compact nature of the unit and its reliability are provided by the unique circulatory system and controls associated therewith.

The system will operate continuously so long as there is fresh input of sewage to the separator unit 12. In accordance with a further aspect of the invention, provision is made to shut the system down if the sewage supply ceases for a long period. More particularly, a temperature sensing unit on the output line from cell 54 may be utilized to shut down operation of the pump 30 and the flow of current of cells 48 and 54 when the cell effluent temperature reaches a given level, such as 95° F. Alternatively, the system may be placed on a clock that regulates the operation of the pump and the electrolytic cells for a predetermined time interval after each closing of valve 34.

In addition to the foregoing components, a blower 90 is mounted to discharge gas from the exhaust port 92. The input to the blower 90 leads from the tops of both tanks 22 and 24, and by way of duct 94, from the top of incinerator 16.

As sewage in the newly filled recycle tank 24 is cycled through electrolytic cells 48, 54 two functions are accomplished. Organic matter is chemically oxidized by the oxidative species which are produced by passing a current through electrolytic cells 48, 54. All pathogenic organisms in the sewage are killed by oxidative species and sodium hypochlorite generated in cells 48, 54. Cells 48, 54 are energized by low voltage at high current. The amount of chemical sewage treatment may be varied by controlling the amount of current which is passed between the electrodes of cells 48, 54.

In order to control odors and to provide an initial degree of treatment to the effluent, a stream of hypochlorite is passed into storage tank 22. This hypochlorite source is recycled, treated sewage.

Thus in accordance with the present invention, the salt water sewage is passed directly through the electrolytic cells. The chemicals which treat the sewage are generated by the salt water sewage directly rather than added to the sewage separately.

Electrolytic cells 48, 54 produce chemical changes by electrochemical transfer in the pollutant compounds. An oxidation reaction converts the organic compounds in the sewage to carbon dioxide and water. Colored and malodorous compounds in the sewage are converted to colorless and odorless substances. The intimate contact of the waste material and the electrochemical action inside the cell increases the tendency for suspended materials such as grease, fats and soaps to coagulate and develop into large chemical complexes that can be more easily removed by filtration. Electro-coagulation is brought about by the polarization of the waste products due to the electric potential set up between the anode and cathode of the cell. Cells 48, 54 produce hypochlorite, chlorine and oxygen from sea water which are toxic to pathogenic organisms in sewage. The cells also increases the dissolved oxygen level of the treated effluent. The effectiveness of the system in accomplishing these chemical reactions is dependent on the nature and concentration of the pollutants in the waste stream and on the amount of current in the cell.

The chemical changes that occur are the result of electron transfer at the electrodes of the cell. The basic reaction in the electrolytic cell which converts sodium chloride to form sodium hypochlorite is well known. Use of such hypochlorite by addition to a waste stream destroys bacteria.

Using the salt water sewage as the electrolyte itself has other advantages. The reactions which occur near the anode of cells 48, 54 produce in part short lived oxidative species such as ozone. Ozone is a strong oxidant and will effectively help in oxidizing the sewage in the cell. This is, of course, not possible if hypochlorite is merely added to a waste stream.

The reactions of the anode surface include:
production of chlorine and hypochlorite,
direct oxidation at the anode surface,
production of active oxygen species (i.e. $O_2$, $O_3$), and
electrolysis of water.

The first three reactions are effective in destruction of organic compounds in the waste stream. The last reaction is relatively ineffective for organic compound destruction but it serves to increase the dissolved oxygen in the discharge water to near saturation.

The reactions and equations set out below will demonstrate the enhanced electrolytic oxidation reaction of the waste which is not possible by merely adding hypochlorite to a waste stream. More particularly, $$\text{Urine + Oxidation} \rightarrow N_2 \pm H_2 + \text{odor free gas} + NO_3; \quad (1)$$

$$\text{BOD + COD + Oxidation} \rightarrow CO_2 + H_2O + \text{inert ash.} \quad (2)$$

BOD refers to biological oxygen demand, a measure of biological material in the waste stream. COD refers to chemical oxygen demand, a measure of chemicals that will use oxygen for further decomposition. The organic compounds are oxidized and converted into $CO_2$ gas and water. The oxidized residue (ash) particles are odor free, highly refractory and readily removed by filtration. Refractory refers to organic compounds that have been oxidized or partially oxidized and will resist further oxidation and are not classified as BOD or COD. Galley waste is another constituent of ship board wastewater which is difficult to treat since it consists of high COD and BOD compounds as well as oils, fats, and protein derivatives.

The oxidation process in the electrolytic cell is ideal for breakdown of these complex compounds. The oils and fats are readily oxidized into $CO_2$ and water, the soaps and polyphosphates are oxidized and coagulated into filterable complexes.

In addition to the oxidation reactions there are also some supplemental reactions which have been found to be beneficial for sewage treatment by this method. The excess oxygen and hypochlorite are odor destruction agents. The malodorous compounds common to sewage such as ammonium compounds and/or mercaptans are oxidized by the cell's reaction.

Since most color compounds in sewage are organic in nature, the oxidative species in the cell react readily to break these complex compounds into various fractured groups, which are effectively bleached.

Other beneficial effects of passing the salt water sewage directly through the electrolytic cells include subjecting the suspended solids to electric charges produced by electric fields which in turn induce polarity changes and result in complex grouping and coagulation. When organic molecules are partially oxidized, the Zeta potential (the natural molecular surface charge which affects the surface tension to enhance agglomeration) is changed such that the magnitude of the molecular dipole moment increases and a correspondingly enhanced agglomeration is experienced in the electric field. In other words, a polyelectrolyte is formed from the organic material. Improved clarity, reduced odor and improved overall appearance of the effluent results. These reactions produce supplemental benefits which are not evident when sewage is not passed directly through the cells.

In construction of the system the objectives of the operational scheme for waste treatment should be kept in mind. They are:
1. to totally oxidize all organic matter in tank 24,
2. to kill all pathogenic organisms in tank 24,
3. to keep the contents of tank 22 completely odor free, and
4. to add a sufficient amount of hypochlorite solution to the contents in tank 22 so that an odor free state can be maintained for long periods of time, such as several days.

All these functions are performed automatically and without recourse to elaborate and expensive automation equipment by the present invention.

The correct amount of chemicals to be generated and recycled based on the initial type of sewage and the waste water flow can be predetermined. Tank sizes, pumping rates and electrolytic cell current settings to produce an optimum treatment system can be interrelated quantitatively as a basis for construction of hardware components.

A predetermined amount of hypochlorite solution can be built up in tank 22 from an initial concentration of zero by observing the following.

After several cycles (n) of operation as above described, the final concentration $C_1$ of hypochlorite in tank 22 is given by the following equation:

$$C_1 = \sum_{n=1}^{\pi} \frac{C_2(Q_1/Q_2)}{(Q_3/Q_2)^n} \tag{3}$$

where $Q_1$, $Q_2$, and $Q_3$ are the respective volumes of liquid as determined by the placement of the electric level probes 72, 74 and 76 at positions 1, 2 and 3, respectively, FIGS. 2 and 3.

Probe positions are selected based on the liquid volumes to be treated and upon certain physical constraints. They are known as input constraints for any given design but may require repositioning after calculating $C_1$. The maximum concentration $C_2$ of hypochlorite in tank 24 is functionally dependent on the amount of current which is supplied to the electrolytic cells and has been empirically determined to be $$C_2 = 0.142I - 0.0019I^2 + 4.76 \times 10^{-6} I^3 \tag{4}$$

for values of $I > 250$ amps.

Concentration of hypochlorite for specific control applications can be either estimated or derived from known publications. Table 1 indicates typical dosages for various control applications as found in "Wastewater Engineering", by Metcalf & Eddy, Inc., McGraw-Hill Book Co., (1972).

TABLE 1

| TYPICAL DOSAGES OF HYPOCHLORITE FOR VARIOUS CONTROL APPLICATIONS | |
|---|---|
| Application | Dosage PPM |
| Slime Growth Control | 3 |
| Odor Suppression | 2 |
| Grease Removal | 7 |
| Sludge Bulking Control | 10 |
| Chemical Precipitation | 6 |
| Disinfection | 5 |

In order to exemplify use of the foregoing criteria disinfection in tank 24 and odor suppression in tank 22 can be specified or $C_1 = 2$ ppm and $C_2 = 24$ ppm can be specified.

Many combinations of $Q_1$, $Q_2$ and $Q_3$ will mathematically satisfy Equation (3) with the given values of $C_1$ and $C_2$. However, the physical constraints such as tank volumes and minimum liquid volumes to prevent complete emptying of the tanks rule out many of the mathematical combinations.

Figure 6:
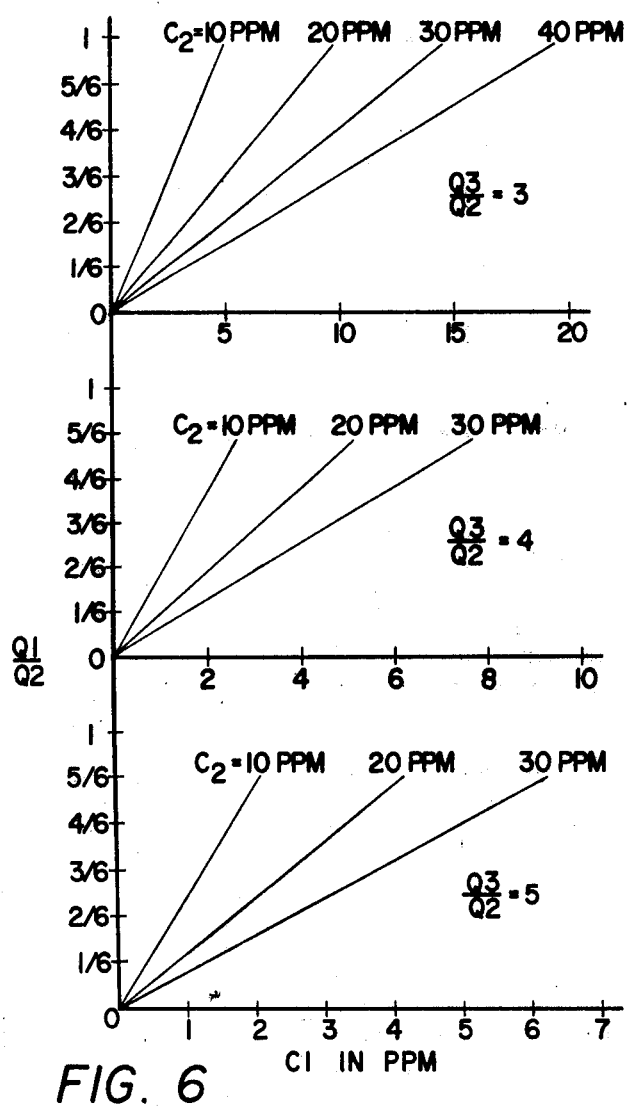
FIG. 6 is a graph interrelating design parameters embodied in the present invention.

Parametric graphs of FIG. 6 have been developed to facilitate the use of Equation (3) and cover most of the conditions encountered in practice. Assume that the conditions of a specific application indicate that $Q_3/Q_2 = 4$. The middle graph of FIG. 6 indicates that $Q_1/Q_2$ must be approximately 3/12 in order to obtain $C_1 = 2$ and $C_2 = 24$.

Figure 7:
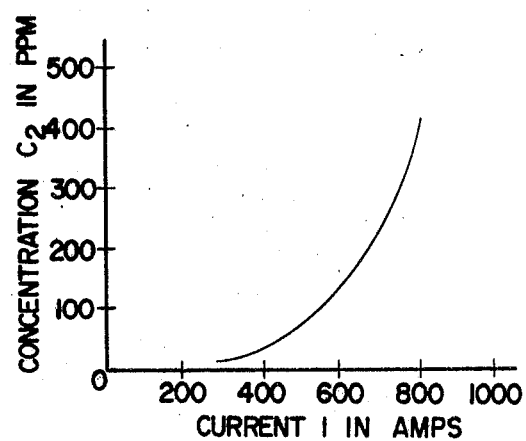
FIG. 7 illustrates hypochlorite concentration in the circulating tank of FIGS. 1-3 as a function of current through the electrolytic cells.

Furthermore, FIG. 7 shows that the current from power supply 80 which energizes the electrolytic cells must be approximately 300 amps in order to yield $C_2 = 24$.

There are many combinations and permutations which the stated equation will fit depending on the constraints that appear to be the most logical starting point. If for instance, only $C_1$ and $Q_3/Q_2$ are fixed, then values of $C_2$ may be determined to satisfy predetermined $Q_1/Q_2$ values, or vice versa, $Q_1/Q_2$ may be fixed and the required $C_2$ value may be calculated.

Referring again to FIG. 3, it will be noted that the waste line 67 leading from filter 64 may be channeled through a valve 100 to line 101 which is a waste line leading overboard in a marine installation. Alternatively, the treated products from the filter 64 may be retained and reused. In the latter case valve 100 may be set so that the treated liquids are channeled by way of line 102 to a storage reservoir 103. The output of the storage reservoir may then be passed through a valve 104 to a pump 105 which supplies utilization system 106 which supplies the input line 70 to the treating system. Alternatively, the input to pump 105 may be controlled by valve 104 for picking up sea water by way of line 107.

Referring now to FIG. 8, the control system involving the sensors 72, 74 and 76 is illustrated. Power from line 110 is supplied to each of three switches (not shown) associated with sensors 72, 74 and 76. As shown, the sensors are float actuated to open and close a switch in the electrical circuit when liquid level reaches a predetermined position. A line 111 extends to controls for valves 44 and 60 to close valve 44 and open valve 60, respectively, when liquid in tank 24 reaches position 1. This causes the level in tank 24 to drop from position 3 to position 1. When the switch in sensor 74 is actuated by its float, line 112 energizes controls which opens valve 34, opens valve 44 and closes valve 60. This causes the transfer of liquid from tank 22 to tank 24. When the level in tank 24 reaches position 3, the float actuates a sensor 76 so that line 113 energizes controls to close valve 34. In this condition, sewage may accumulate in tank 22 while the salt water laden sewage in tank 24 circulates through the electrolytic cells.

It will be apparent that other types of sensors could be employed. Heat sensors, light sensors and conductivity sensors as used in liquid level applications are all known and available. It has been found that the simplest and most reliable are float actuated switch units normally used in many other applications.

The examples given herein for the flow rate specified and the components utilized as above identified may be varied depending upon the requirements of a particular installation. It is not intended that the invention be limited by any particular component or capacity of system. Rather, having described the invention in connection with certain specific embodiments thereof, it is to be understood that further modifications may now suggest themselves to those skilled in the art and it is intended to cover such modifications as fall within the scope of the appended claims.

We claim:
1. An automatic marine sewage treatment unit comprising:

a. storage means including a first tank and a second tank,
b. a sewage inlet channel leading to said first tank including a separator for removal of solids above a predetermined size from incoming salt water based sewage,
c. a pump having
  i. inlet structure for receiving liquid from said second tank and a flow channel including a first valve leading from said first tank, and
  ii. a first outlet channel structure including a second valve and an electrolytic cell leading back to said second tank and a second outlet channel structure including a system output line having a third valve therein,
d. means including high level sensor means in said first tank to close said second valve and open said third valve to empty said second tank,
e. means including low level sensor means in said second tank to close said third valve and open said first and second valves for liquid transfer to said second tank through said cell, and
f. means including high level sensor means in said second tank to close said first valve.

2. An automatic marine sewage treatment unit comprising:
a. multiple sewage receiving tanks,
b. a sewage inlet channel leading to a first of said tanks having screen means for removal of solids above a predetermined size from incoming salt water based sewage, and
c. flow control means having structure for receiving liquid from the second of said tanks and by way of a first conduit including a first valve leading from said first of said tanks, and leading by way of a second conduit including a second valve and an electrolytic cell to said second of said tanks and by way of a third conduit including a third valve to a system output line, means including sensor means in said tanks to close said second valve and open said third valve to empty said second of said tanks upon high level in said first of said tanks, to close said third valve and open said first and second valves for liquid transfer to said second of said tanks through said cell upon low level in the second of said tanks, and to close said first valve upon high level in said second of said tanks.

3. An automatic marine sewage treatment unit comprising:
a. storage means including a first tank and a second tank,
b. a sewage inlet channel leading to said first tank including a separator for removal of solids above a predetermined size from incoming salt water based sewage,
c. circulation means responsive to liquid levels in said tanks for batch transfer of liquids from said first tank to said second tank and for circulating a steam of liquids from and to said second tank while filling said first tank,
d. electrolytic treatment means in said circulation means for subjecting said stream to D.C. current flow, and
e. means to discharge treated liquids from said second tank when said first tank reaches a control level and for delivering a predetermined fraction of said treated liquids to said first tank.

4. An automatic marine sewage treatment method comprising the repetitive cycle:
a. accumulating sewage laden salt water in a first tank while circulating sewage laden salt water from a second tank through an electrolytic cell and back to said second tank for build up of hypochlorite levels therein, and
b. responsive to liquid levels in said tanks, batch transferring a minor fraction of liquid from said second tank to said first tank while eliminating a major fraction of liquids from said second tank and then batch transferring a major fraction of liquid in said first tank to said second tank.

5. An automatic marine sewage treatment unit comprising:
a. an accumulation tank and a recycle tank,
b. a salt water based sewage supply for deposit in said accumulation tank,
c. structure including a pump connected to move liquid from said recycle tank and selectively from said accumulation tank to said recycle tank through an electrolytic cell and to a system output line,
d. means including a high level sensor in said accumulation tank to direct output from said pump to said system output line,
e. means including a low level sensor in said recyle tank to permit flow to said pump from said accumulation tank and to direct output from said pump to said recycle tank through said cell, and
f. means including a high level sensor in said recycle tank to terminate flow from said accumulation tank to said pump.

6. In salt water sewage treatment where volume controllers set liquid levels in an accumulation tank receiving salt water borne sewage to be treated and a recycle tank, the method of controlling hypochlorite concentration $C_1$ and $C_2$ in said accumulation and recycle tanks, respectively, comprising:
a. reducing the volume of liquids in said recycle tank to a smaller volume $Q_2$ when said accumulation tank attains an intermediate liquid volume $Q_1$ and concurrently introducing part of the liquids from said recycle tank into said accumulation tank to increase the liquid in said accumulation tank to a highest volume $Q_3$,
b. when said volume $Q_2$ is reached in said recycle tank, transferring liquid from said accumulation tank to said recycle tank until the volume of liquid in said accumulation tank reaches volume $Q_3$, and
c. thereafter as said accumulation tank is filling with sewage laden salt water to be treated, circulating liquid in said recycle tank through an electrolytic cell to raise the hypochlorite concentration in said recycle tank.

7. The method set forth in claim 6 in which concentrations $C_1$ and $C_2$ are related in the following manner:

$$C_1 = \sum_{n=1}^{\infty} \frac{C_2(Q_1/Q_2)}{(Q_3/Q_2)^n}$$

where $n$ is the number of fill-empty cycles completed and $$C_2 = 0.142I - 0.0019I^2 + 4.76 \times 10^{-6} I^3$$

for values of $I > 250$ amps.

* * * * *